C. L. WILCOX.
Planter & Cultivator.

No. 105,285.  Patented July 12, 1870.

WITNESSES:
J. H. Burridge
Frank Alden

INVENTOR:
Campbell Wilcox
per Burridge & Co

United States Patent Office.

CAMDEN L. WILCOX, OF WAYNE TOWNSHIP, OHIO.

Letters Patent No. 105,285, dated July 12, 1870.

IMPROVEMENT IN COMBINED CULTIVATOR AND CORN-DRILL.

The Schedule referred to in these Letters Patent and making part of the same.

*To all whom it may concern:*

Be it known that I, CAMDEN L. WILCOX, of Wayne Township, in the county of Ashtabula and State of Ohio, have invented a new and improved Combined Cultivator and Corn-Drill, of which the following is a specification.

Drawing.

Figure 2:
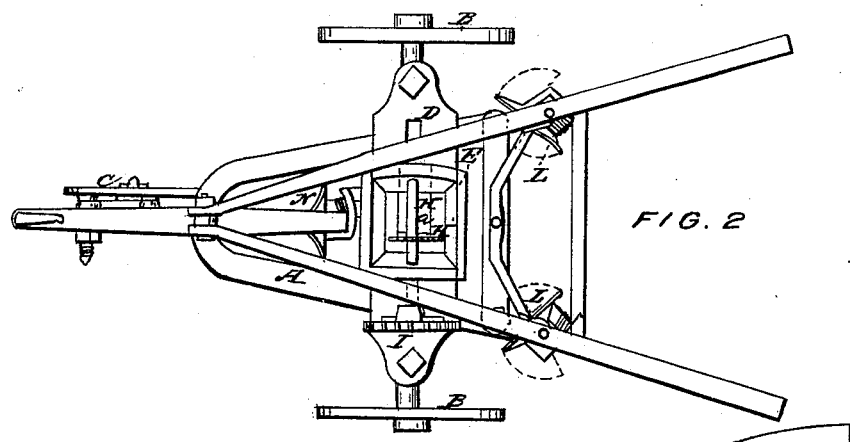
Figure 1:
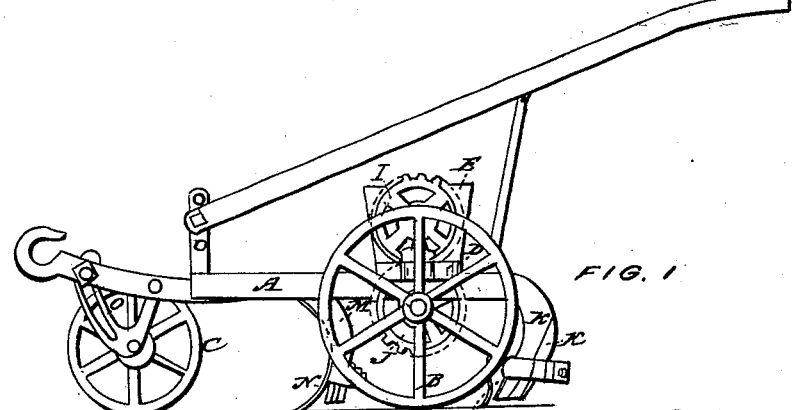
Figures 3, 4:
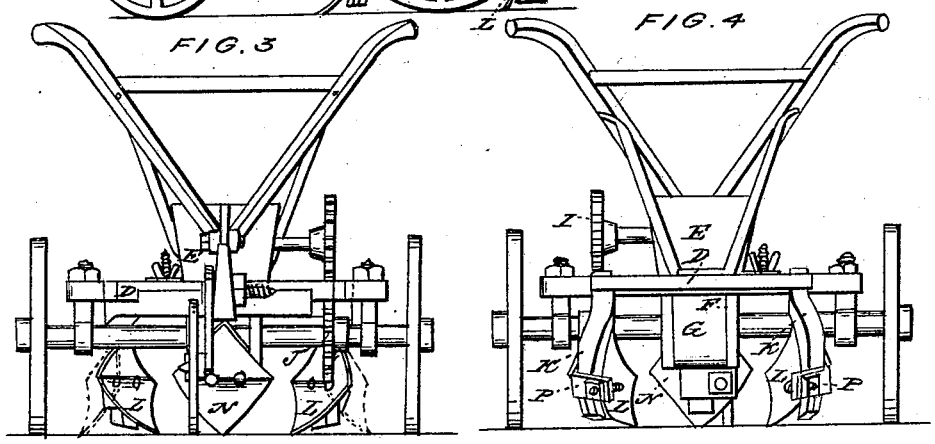

Figure 1 is a side view of the drill.
Figure 2, a view of the top.
Figure 3, a front view.
Figure 4, a view of the rear end.
Like letters of reference refer to like parts in the different views.

Objective.

The purpose of this invention is to facilitate the planting and cultivation of corn, by means of a drill, whereby the seed is sown or planted in drills by a seed-dropper, actuated by certain devices hereinafter described. The machine may also be used as a cultivator, for agitating the ground while the plants are growing, as hereinafter set forth and described.

Description.

In fig. 2, A is a frame, mounted upon the wheels B and C.

The axle of the wheels B are secured to the frame by means of a platform, D, upon which the seed-box E is placed for holding the grain to be planted.

Secured to the axle, and immediately under the seed-box, is a cylinder, F, fig. 4, provided with a number of chambers or cups, G, having a holding capacity of one or two grains, the purpose of which will presently be shown.

On the shaft H, fig. 2, is an agitator, H', operated by a cog-wheel, I, which is so arranged as to engage the wheel J, figs. 1 and 3, on the axle or shaft of the wheels B.

It will be observed that the rear ends of the frame A are curved downward, forming thereby a pair of standards, K, to the lower end of which is secured shares, L.

M, fig. 1, is also a standard, to the lower end of which is also secured a share, N. The purpose of said shares is for cultivating the ground preparatory to and after the planting.

The practical operation of this machine is as follows:

The seed-corn is placed in the box E, and the drill then adjusted in the line of its work. As the machine moves forward the cylinder F is thereby made to revolve by the gearing referred to. As the open cup G passes under the seed-box, seed drops therefrom, through an opening, a, fig. 2, which is then carried around and dropped into the furrow made by the share N, which is then immediately covered by the shares L, one of which throws the dirt along one side of the furrow onto the grain, and the other upon the opposite side.

The distance that the grain is dropped along in the row is regulated by the number of cups, G, that may be opened for receiving the grain from the seed-box.

In the drawing one only is shown as being open, whereas there are six cups, five of which are closed; hence the distance apart that the grain may be dropped will be governed by the number of open cups, and which may be closed by a filling of wood.

In order to facilitate the escape of the grain from the seed-box, the agitator H' keeps the seed constantly in motion, so that it will flow readily through the opening.

In order to use the implement for cultivating only, the seed-box is removed. In this condition it is converted into a most efficient machine for that purpose, either for preparatory or after cultivation.

The depth that the shares may run into the ground is governed by the wheel C, it being attached to the frame A by a slotted stay, O, whereby the front end of the frame may be lowered or raised, so as to throw the shares more or less into the ground.

The shares are attached to the standards by a clamp, P, fig. 4, which embraces the standard, and secured thereto by a nut, Q.

It will be observed that the ends of said standards K are square, in shape, and are so arranged that one face of the square is turned toward the furrow made by the share N, so that each of the outside shares will throw the dirt in that direction. The position of the shares may be changed by placing them on the outer square of the standard, so that they will throw the dirt outwardly, or away from the furrow, thereby rendering the machine more efficient as a cultivator, for stirring the soil and covering the weeds.

Claim.

What I claim as my invention, and desire to secure by Letters Patent, is—

The arrangement, with a cultivator, constructed as described, of the detachable seeding apparatus, consisting of the seed-box E, agitator H', and cylinder F, with the cups G, operating in the manner substantially as and for the purpose set forth.

CAMDEN L. WILCOX.

Witnesses:
J. H. BURRIDGE,
FRANK S. ALDEN.